United States Patent

[11] 3,588,385

[72] Inventor Laurence Stanley Moye
London, England

[21] Appl. No. 635,459
[22] Filed May 2, 1967
[45] Patented June 28, 1971
[73] Assignee International Standard Electric Corporation
New York, N.Y.
[32] Priority May 6, 1966
[33] Great Britain
[31] 20132/66

[54] ECHO SUPPRESSION IN LONG DISTANCE TELEPHONE CIRCUITS
4 Claims, 5 Drawing Figs.

[52] U.S. Cl. .......... 179/170.2
[51] Int. Cl. .......... H04b 3/22
[50] Field of Search .......... 179/170.2

[56] References Cited

UNITED STATES PATENTS

| | | | |
|---|---|---|---|
| 3,465,106 | 9/1969 | Nagata et al. | 179/170.2 |
| 3,499,999 | 3/1970 | Sondhi | 179/170.2 |
| 3,500,000 | 3/1970 | Kelly et al. | 179/170.2 |

FOREIGN PATENTS

| | | | |
|---|---|---|---|
| 3.654/57 | 6/1957 | Japan | 179/170.2 |

OTHER REFERENCES

Sondhi, M. M.; " An Adaptive Echo Canceller" , BELL SYSTEM TECH. JOURNAL, Vol. 46, March 1967, pgs. 497-—511

Sondhi, M. M.; " A Self Adaptive Echo Canceller" , THE BELL SYSTEM TECH. JOURNAL; Vol. 45, Dec. 1966, pgs. 1851—1854

Becker, F. K. & Rudin, H. R., " Application of Automatic Transversal Filters to the Problem of Echo Suppression" , BELL SYSTEM TECHNICAL Journal, Vol. 45, Dec. 1966, pgs. 1847—1850

*Primary Examiner*—Kathleen H. Claffy
*Assistant Examiner*—William A. Helvestine
*Attorneys*—C. Cornell Remsen, Jr., Rayson P. Morris, Percy P. Lantzy, J. Warren Whitesel, Phillip A. Weiss and Delbert P. Warner

ABSTRACT: The invention cancels echoes in extremely long distant transmission channels. An electrical signal which is equivalent to the echo is generated, inverted, and added to a signal being received. Therefore, the equivalent echo signal cancels the real echo signal.

ECHO SUPPRESSION IN LONG DISTANCE TELEPHONE CIRCUITS

Figure 1:
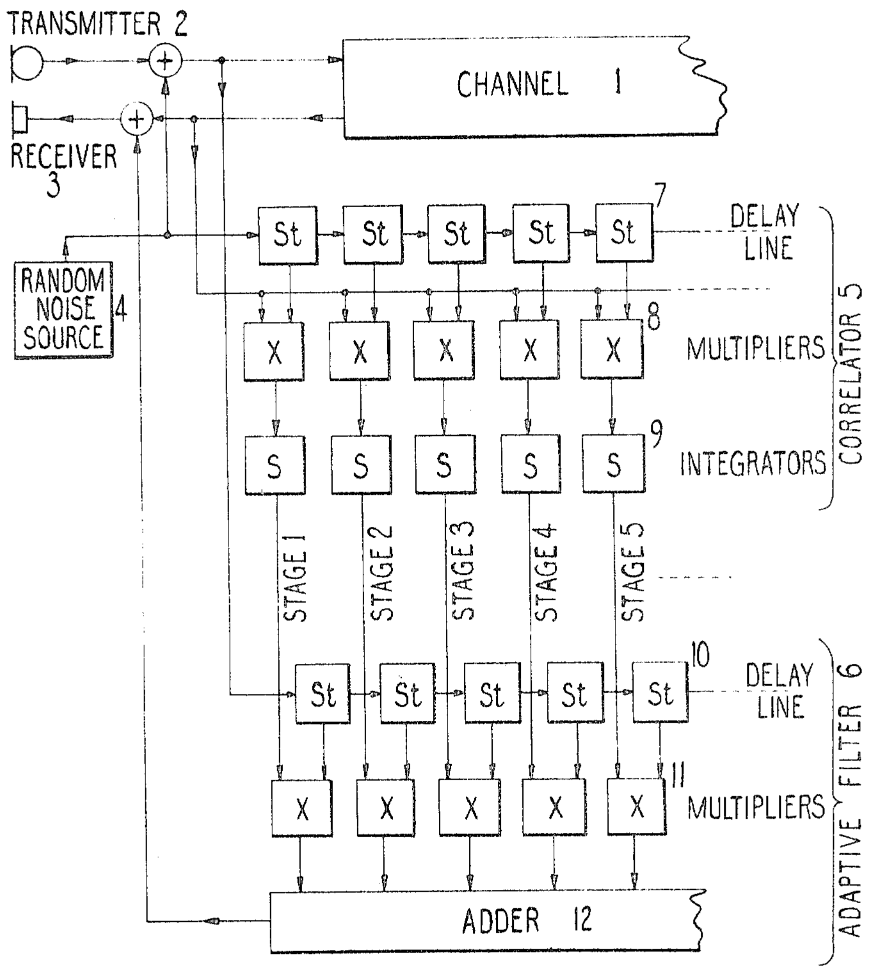

This invention relates to a method and apparatus for echo suppression in long distance both-way communication circuits.

In a telephone circuit, for example, using a single channel each way for two-way communication, it is impossible to match so well as to avoid all echoes. On short circuits this does not matter because the delay of the echo is similar to that normally caused by room acoustics. The speaker is used to such an echo, and it does not disturb him. But on long distance cable circuits, the echo delay can become so long that the speaker will mistake it for a reply from the other end of the line. For example, from London to Sydney, the echo delay is of the order of half a second. Such an echo is intolerable unless its level is very low, and normally it must somehow be reduced.

According to the invention there is provided a method of suppressing echoes in a long distance both-way communication circuit including transmitting a signal over the forward channel, monitoring the signal in the return channel, determining the echo characteristics of the circuit, generating dummy echoes of signals in the forward channel and adding the dummy echoes to the return channel to cancel the real echoes in the return channel.

In one embodiment of the invention the method includes transmitting a reference signal in the forward channel, applying to the same reference signal incremental delays, cross-correlating the return echoes of the reference signal with the delayed reference signal to produce a plurality of samples of the echo impulse response for the circuit, modifying the same speech signal as is transmitted in the forward channel by the echo impulse response samples so obtained to produce dummy echoes, inverting and adding the dummy echoes to the return channel to cancel the real echoes.

The invention also provides terminal equipment for a long distance both-way communication circuit including transmitting equipment and receiving equipment connected to forward and return channels of the circuit respectively, means for monitoring the echo characteristics of the circuit, means for generating dummy echoes corresponding in characteristics to those produced by the circuit, means for inverting the dummy echoes and means for adding the inverted dummy echoes to the input to the receiving equipment.

In one embodiment of the invention the equipment includes transmitting equipment and receiving equipment connected to forward and return channels of the circuit respectively, a local signal source the output of which is fed to the forward channel, a cross-correlation network, the local signal and the signal in the return channel both being applied to the cross-correlation network, an adaptive filter network responsive to the output of the cross-correlation network, the output of the transmitting equipment being applied also to the adaptive filter network where it is modified in accordance with the output from the cross-correlation network, and means for adding the inverted output of the adaptive filter network to the input to the receiving equipment.

In an alternative embodiment the equipment includes transmitting equipment and receiving equipment connected to forward and return channels of the circuit respectively, a cross-correlation network, means for applying the same signal as is transmitted over the forward channel to the cross-correlation network, means for applying the signal received over the return channel to the cross-correlation network whereby the cross-correlation network produces a plurality of samples of the echo impulse response of the circuit, an adaptive filter network responsive to the output of the cross-correlation network, the output of the speech transmitting equipment being fed also to the adaptive filter network where it is modified in accordance with the output from the cross-correlation network to form a dummy echo and means for adding the inverted output of the adaptive filter network to the return channel in advance of the point from which the input to the cross-correlation network is taken.

The invention depends on measuring and simulating the impulse response of the echo path in a long distance both-way circuit, which will be called the echo impulse response of the circuit. This is measured by making use of the fact that the cross-correlation function of the input to and output from a circuit is the convolution integral of the autocorrelation function of the input and the impulse response of the circuit. If the input is a random noise, its autocorrelation function will be a unit pulse at zero delay, so that this when convolved with the impulse response will not alter it. Thus the cross-correlation function of a random noise input to a circuit and the output of that circuit is simply the impulse response of the circuit. Now if the noise is sent from one end of the circuit, and cross-correlated with the signal returning to that end, the cross-correlation function will be the echo impulse response of the circuit that is required. This argument is not altered by the presence of a signal from the other end of the circuit or even another signal from the same end provided that these other signals have zero correlation with the noise, and that the return signal is cross-correlated only with the transmitted noise.

Thus it is possible to monitor the echo impulse response of the circuit whilst it is in use. As the impulse response changes only every few minutes, it is possible to take several seconds to determine it and to use noise of a very small amplitude, small enough to be negligible compared to the other noise present in the circuit.

The filter which simulates the required impulse response does this directly in the time domain by convolving its input with the impulse response. The input, which is the transmitted speech signal, is delayed in a tapped delay line, and the output of each tap multiplied by the value of the impulse response for that value of delay. The sum of the products is the required output signal, i.e. a dummy echo. The echo impulse response is computed by the correlator for the same values of delay, and the correlator outputs feed the multipliers in the filter directly.

Figure 2:
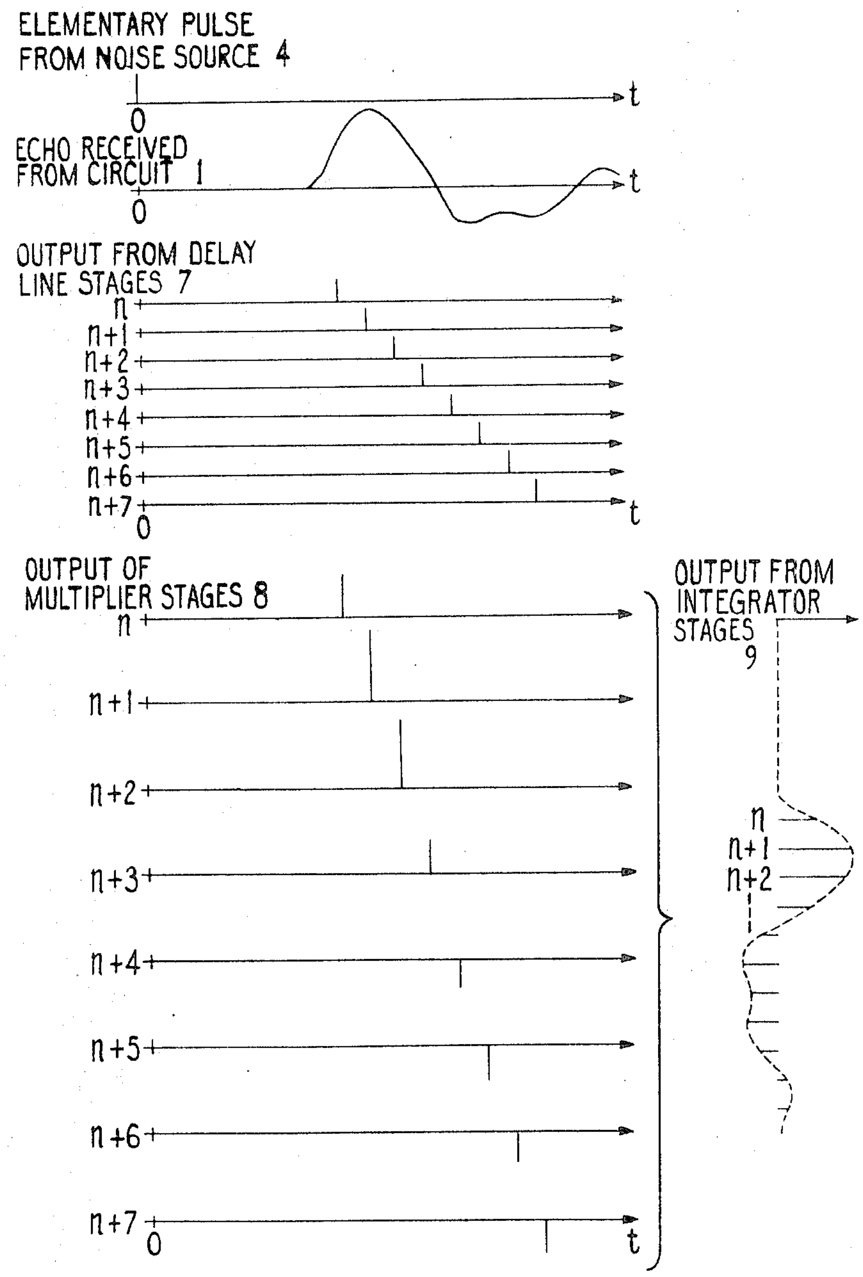
Figure 3:
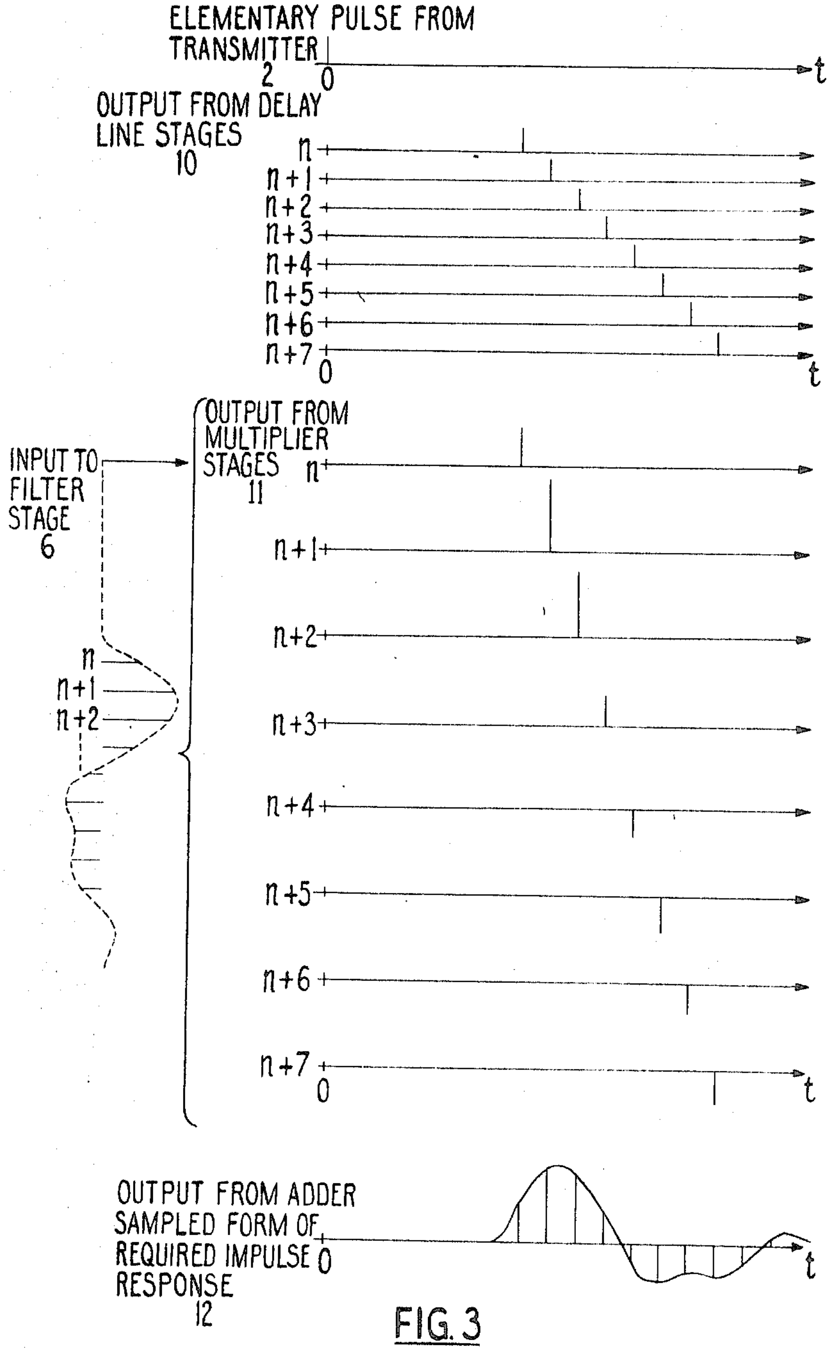
Figure 4:
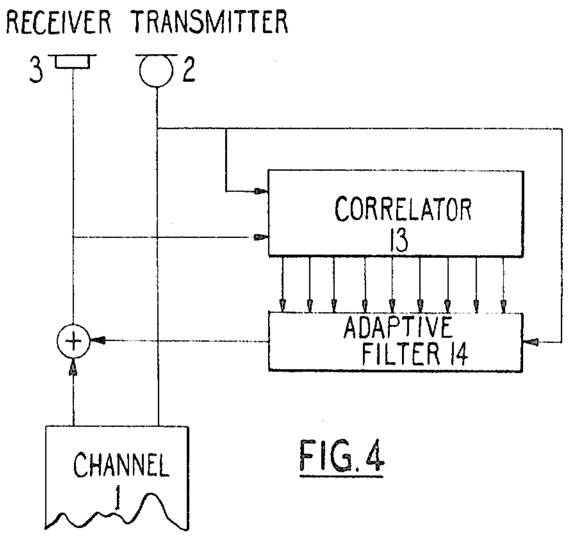
Figure 5:
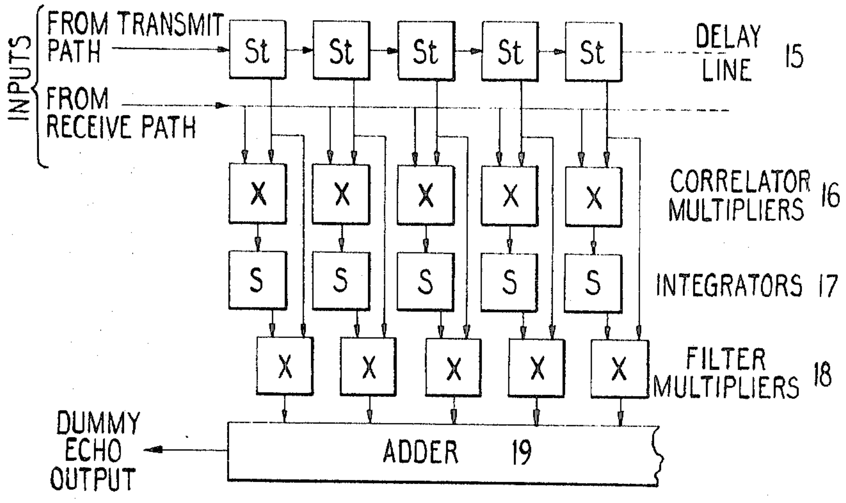

In order that the above and other features of the invention may be more readily understood, embodiments of the invention, by way of example only, will now be described with reference to the accompanying drawings, in which FIG. 1 is a block diagram of one embodiment utilizing an independent noise source, FIG. 2 is a diagram illustrating measurement of the channel echo impulse response by the correlator for a single elementary pulse of monitoring noise, FIG. 3 illustrates the action of an adaptive filter on a single elementary pulse of transmitted signal, FIG. 4 is a block diagram of a second embodiment utilizing the transmitted speech signal as the source of monitoring noise, and FIG. 5 is a block diagram of simplified equipment utilized in the arrangement of FIG. 4.

A both way telephone circuit 1 in FIG. 1 is connected to a speech transmitter 2 and a speech receiver 3. The signal received by the speech receiver 3 and the return channel of the circuit 1 is fed together with the output from a random noise source 4 to a correlation network 5 which monitors the signals being sent and received in the circuit and computes from them the echo impulse response of the circuit. The outputs from the correlation network 5 go to control an adaptive filter network 6 so that it has the same impulse response as the echo path of the circuit 1. The filter 6 is used to generate from the transmitted signal in the forward channel of the circuit 1 a dummy echo which can be added to the received signal in the return channel of the circuit 1 in such a way as to cancel any echo being received from the circuit.

As the system works in the time domain, and generates a dummy echo by simulating impulse responses, it is convenient to describe its operation in terms of elementary impulses considering the signals to be made up from an infinity of contiguous elementary pulses making together a continuous wave.

The correlation network 5 has two inputs, the output of the random noise source 4, which is also added to the transmitted signal, and the signal received in the return channel of the circuit. The operation of the correlation network 5 is considered in respect of a single elementary pulse from the noise source 4 with reference to FIG. 2. The pulse enters a tapped delay line 7 and the forward channel of the circuit 1, and a short time later its echo arrives in the return channel of the circuit 1 and is fed to a number of multipliers 8, there being one multiplier X for each tapping point $\delta t$ on the delay line 7. In any one multiplier, the effect of the delayed pulse from the delay line 7 is to sample the received echo to give a pulse whose size is proportional to the product of the height of the original pulse and the magnitude of the echo at that time. As the magnitude of the echo is itself proportional to the size of the original pulse, the output of the multiplier is proportional to the product of the square of the pulse height and the amplitude of the echo impulse response for the particular delay of that stage. The output of each multiplier $\int$ goes to the integrators 9, there being one integrator for each multiplier X, where the signal is averaged to give as the integrator output the product of the means square of the pulse height (i.e. the means square amplitude of the noise signal) and the value of the impulse response for the delay relevant to that particular stage.

The adaptive filter 6 contains a bank of multipliers 11, corresponding one to each stage of the correlator 5, whose inputs are the outputs of the correlator integrators 9 and a delayed version of the transmitted signal which is fed to the multipliers 11 by means of a second tapped delay line 10. Again an elementary pulse from the transmitted signal will be considered with reference to FIG. 3, assuming that in a short period of time the outputs of correlator integrators change very little and can therefore be considered fixed.

The elementary pulse enters the delay line 10 and propagates down it arriving at each successive multiplier 11 and a time $\delta t$ later than at the one before. The multipliers 11 change the height and if necessary the polarity of the pulse in response to echo impulse responses and pass it on to the adder network 12. The output of the adder 12 therefore for this elementary pulse is a series of pulses the amplitude of each of which is the product of the original pulse and the integrator output for that stage. But the integrator output is the echo impulse response for the particular delay of that stage so that the series of pulses at the adder output are samples of the echo that the pulse would produce.

Because the control inputs to the filter multipliers are in effect fixed, the filter acts as a linear system with the multipliers acting as attenuators, amplifiers or inverters according to their inputs. Thus the output produced by the complete input signal is no more than the sum of the outputs produced by the elementary pulses of which it is considered to consist. It is therefore the echo that would be produced by the transmitted signal in a network with the impulse response represented by the integrator outputs. In so far as this impulse response is that of the circuit echo path, then this is the dummy echo required to cancel the actual echo in the return channel, and this dummy echo derived from the adder 12 is fed inverted into the return channel of the circuit 1.

In the actual operation of the correlation network 5, there are other signals present in the return channel which are fed to the multipliers 8; there is the speech signal from the far end of the circuit, noise picked up in the circuits and the echoes contributed by the other elementary pulses which together constitute the monitoring noise signal. The speech and channel noise signals bear no relationship to the elementary noise pulses entering the other inputs of the multipliers, so, provided these various signals have zero means, their contributions to the multiplier outputs will have zero means and will make no contribution to the averaged output of the multipliers. When a particular elementary noise pulse enters multiplier, the contribution to the other input from the echoes of the other elementary pulses will not be related to the amplitude or polarity of the pulse provided the noise is completely random, so that these components also average out to zero at the output of the integrators.

In practice, because it is not possible to integrate for an infinite time, the contributions of the other signals in the circuit and the contribution of the other elements of the monitor noise cannot be zero. The echo impulse response as measured by the correlators will be in error to an extent which depends upon the relative amplitudes of noise and speech signals etc.

The system can be operated with the monitor noise added at very low level to the transmitted signal all the time. In this way it is possible for the system to follow a slowly changing echo characteristic by giving the correlator integrators a moderately short time constant so that their outputs can follow the variations in the echo impulse response, but long enough for the contributions to the outputs from the other signals in the circuit to average out.

In a telephone circuit involving a cable link, the echo does not change all the time, but only as each new call is set up. It is possible to avoid the annoyance of having monitor noise added to the signal all the time by transmitting a burst of monitor noise at the beginning of each new call. If the correlator integrators are given quasi-infinite time constants, or provided with stores to hold the output during the call, the echo impulse response can be determined during the transmission of the burst of monitor noise at the beginning of the call and no additional noise is needed thereafter.

Because only a small amount of monitor noise can be added continuously to the transmitted signal, it takes a long time to measure the echo characteristic by this method; the integrators must have very long time constants and only very slowly changing circuits can be handled. The other method requires that a burst of fairly loud noise several seconds long be allowed to reach the distant subscriber's subset for this is where the echo arises. This noise is likely to prove offensive, and it would be altogether more satisfactory if the speech signals in the circuit could be used to determined the echo characteristics. This is not possible using the methods described so far because they rely on the use of a random noise to monitor the channel which noise, being featureless, will not affect the results. However, by using a feedback system it is possible to use the transmitted speech by using an iterative procedure to determine the echo characteristic.

FIG. 4 shows the correlator and adaptive filter arrangement connected for feedback operation. The feedback arrangement differs from that of FIG. 1 in that the inputs to the correlator network 13 are the total transmitted signal and the received signal after cancellation of the real echo with the dummy echo. No local noise is deliberately added to the circuit at all.

The correlation network 13 and adaptive filter network 14 of FIG. 4 are shown in greater detail in FIG. 5. A tapped delay line 15 is fed with the signal from the forward channel of the circuit 1 and the signal received from the return channel after the addition of a dummy echo previously determined is fed to the correlator multipliers 16 together with the outputs from the tapped delay line 15. The outputs of the multipliers 16 are fed to integrator networks 17 and the integrated outputs are fed to the filter multipliers 18 together with the delayed transmitted signal from the delay line 15. The outputs of the filter multipliers 18 are then fed to the adder 19 which generates the dummy echo output.

The system works by virtue of the fact that when the output of the correlator is the correct impulse response, the echo is completely cancelled. There is no echo in the return channel after the addition of the inverted dummy echo so there is nothing in common between the two inputs to the correlator. The correlator integrators have quasi-infinite time constants so that when they have attained the required values and the echo is cancelled their inputs from the multipliers have zero means and the outputs maintain the correct values indefinitely.

When the echo impulse response of the circuit changes, the correlator multiplier outputs cease to have zero means, they have mean values proportional to the error between the integrator outputs and the new echo impulse response convolved with the autocorrelation function of the speech being transmitted. This convolution confuses the outputs; if the transmitted signal were a random one, its autocorrelation function would be zero everywhere but at zero delay, and it would not confuse the issue. Fortunately autocorrelation function have the property that their greatest maximum is always at zero delay, so that the error signal at the multiplier outputs is greatest where the actual error is greatest and thus inevitably tends to alter the values in the integrators to reduce the error.

The advantages of this latter method of operating the system are that no noise has to be added to the circuit, and the large amplitude of the transmitted speech compared with the small amplitude which a continuous monitoring noise would have to have or, equally, the long time available to compute the echo impulse response compared with the limited time available with an initial monitoring noise burst, which makes it possible to cancel the echo much more accurately. There is also a saving in equipment because the signal carried by the two delay lines in the feedback system is the same so that the same delay line can be used to supply both the correlator and filter multipliers.

The requirement for the monitoring noise is that it should be random in relation to the circuit bandwidth. Because it is necessary to delay the noise signal it is convenient that it should be a random telegraph wave, i.e. that it has only two states of equal and opposite amplitude between which it switches randomly at defined intervals. Such a signal can conveniently be delayed in a string of binary circuit connected as a shift register, and this is much cheaper and easier to use than an analogue delay line. The rate at which the random telegraph wave may switch is the same as the rate at which it is shifted down the shift register. This in turn determines the unit delay provided by the shift register and hence the spacing of the samples of the echo impulse response represented by the output of each stage of the correlator. All these things depend upon the bandwidth of the circuit and the minimum sampling rate associated with it by Nyquist's sampling theorem.

If the noise signal used is a random telegraph wave, the multipliers in the correlator have delayed versions of it for one of their inputs. They are therefore required to multiply the other input by plus or minus a constant and they need be no more than switches switching between normal and inverted versions of the other input. There is no objection in principle to using a normal analogue noise signal for the monitoring noise, but this would require that the delay line and multipliers be much more complicated and expensive and would not improve the operation in any way.

When the system is operated with continuous monitoring noise it is necessary for the integrators to have fairly long, but limited time constants, probably of the order of a few seconds. These could be Miller integrators, or, if these proved too unstable, RC integrators followed by high impedance amplifiers. If the system is operated with a burst of monitoring noise at the beginning of each new call, then the integrators must be capable of storing their output value during the whole of the call. For this to be achieved using analogue circuits would require that a high quality capacitor be charged up by a current source to perform the integration of the multiplier output, and then isolated by a switch, a relay would do, while the charge on it would be read out during the call by a very high impedance amplifier using an electrometer valve or field-effect transistor.

The delay line of the adaptive filter has to carry the transmitted speech signal. There are many techniques for delaying audio signals and any of them could be used, e.g. lumped circuit delay lines, acoustic delay lines (quartz, mercury, magnetostrictive etc.) tape delays and magnetic drums.

The filter multipliers have one input, from the correlator outputs, which varies only very slowly if at all during the course of a call. They may therefore be more conveniently thought of as electrically controlled attenuators. They could use temperature sensitive resistors in an attenuator circuit, or any of the techniques available for multiplying higher speed signals, i.e. pulse width/pulse height modulation or logarithmic amplifiers.

The adder which adds together the outputs of the filter multipliers could be a resistive network fed from buffer amplifiers or an operational adder, and it could be combined with the adder which adds the dummy echo into the receive path. There are no unusual requirements for these circuits except insofar as the number of channels is likely to be high (several hundred) so that careful design would be needed.

Only one delay line is needed for the feedback arrangement because both the correlator and the filter need the same delayed versions of the transmitted signal. With the monitoring noise, the delay line that delay the transmitted signal has to be accurate or the dummy echo will not cancel the actual echo adequately. Because in the feedback method of operation the correlator continues to adjust the filter until such time as the echo is completely cancelled, the delay line need not produce a perfect pure delay. But it is necessary that the characteristics be such that the required dummy echo can be made up from a mixture of its outputs; if, for instance, the higher frequencies of the signal never reached the far end of the delay line, but the echo contained high frequencies which had suffered such long delays, then the dummy echo would never be able to cancel these components out.

This limitation on the characteristics of the delay line for the feedback arrangement is not severe if the characteristics of the echo have been derived by passage through a cable as they will therefore be the same sort of characteristics as are produced by imperfect delay lines. Indeed, this argument can be carried further on the assumption that the echo can be more simply constructed from a relatively small number of signals which have been passed through special networks preceded by a pure delay which is the same for all the signals. This would likely need far fewer networks than would be needed for constructing the dummy echo from differently delayed versions of the transmitted signal.

The correlator multipliers for the feedback arrangement again benefit from the fact that it is not necessary to measure an accurate correlation function. Indeed, the function that is computed is already confused by the characteristics of the transmitted signal, and it could probably be confused still further by using some very crude form of multiplier. It would probably be quite adequate to clip infinitely the delayed version of the transmitted signal and use gates for the multipliers. Alternatively, multipliers in which the logarithms of the signals are found and added could be used provided that there was no tendency for zero errors to arise. In fact, it is only necessary for these multipliers to produce a signal which is roughly proportional to the product of the two inputs when it is averaged, and which has an accurate zero mean when the product of the signals has zero mean.

The integrators for the feedback arrangement must have as long a time constant as is convenient because any droop in the integrators must be made up by an echo being allowed through the system. Miller integrators would be suitable.

The multipliers in the filter for the feedback arrangement must be linear as regards the delayed version of the transmitted signal. If this suffers nonlinear distortions it cannot be made to cancel the echo, but the other input to the multipliers, the control signal, need not have a linear effect because the feedback will take care of any error. Thermal multipliers will very easily answer this specification.

It is to be understood that the foregoing description of specific examples of this invention is made by way of example only and is not to be considered as a limitation on its scope.

I claim:

1. Terminal equipment for a long distance both-way communication circuit including transmitting equipment and receiving equipment connected to forward and return channels of the circuit respectively, a local signal source the output of which is fed to the forward channel, correlation network, the local signal and the signal in the return channel both being applied to the correlation network, an adaptive filter network responsive to the output of the correlation network, the output of the transmitting equipment being applied also to the adaptive filter network where it is modified in accordance with the output from the correlation network, and means for adding the inverted output of the adaptive filter network to the input to the receiving equipment, and wherein correlation network includes a tapped delay line to which the local signal is fed, a plurality of multiplier circuits one for each tapping point on the delay line, each multiplier being fed with the delayed transmitted local signal and the returned signal whereby an output being the product of the two inputs is obtained for a corresponding delay, a plurality of integrator circuits, there being one for each multiplier, each integrator circuit being fed with the output of the associated multiplier to generate a sample of the echo impulse response for that amount of delay in the circuit.

2. Terminal equipment for a long distance both-way communication circuit including transmitting equipment and receiving equipment connected to forward and return channels of the circuit respectively, a local signal source the output of which is fed to the forward channel, correlation network, the local signal and the signal in the return channel both being applied to the correlation network, an adaptive filter network responsive to the output of the correlation network, the output of the transmitting equipment being applied also to the adaptive filter network where it is modified in accordance with the output from the correlation network, and means for adding the inverted output of the adaptive filter network to the input to the receiving equipment, and in which the correlation network includes a tapped delay line to which the local signal is fed, a plurality of multiplier circuits one for each tapping point on the delay line, each multiplier being fed with the delayed transmitted local signal and the returned signal whereby an output being the product of the two inputs is obtained for a corresponding delay, a plurality of integrator circuits, there being one for each multiplier, each integrator circuit being fed with the output of the associated multiplier to generate a sample of the echo impulse response for that amount of delay in the circuit, and in which the adaptive filter network includes a tapped delay line, similar to that of the correlation network, to which the forward signal is applied, a plurality of multiplier circuits one for each tapping point on the delay line, each multiplier circuit being fed with the delayed signal and the corresponding echo impulse response to produce a plurality of dummy echoes, and adder circuit in which said components of the dummy echo are combined and means for inverting and adding the combined dummy echo to the input to the receiving equipment.

3. Terminal equipment for a long distance both-way communication circuit including transmitting equipment and receiving equipment connected to forward and return channels of the circuit respectively, a correlation network, means for applying the same signal as is transmitted over the forward channel to the correlation network, means for applying the input to the receiving equipment to correlation network whereby the correlation network produces a plurality of samples of the echo impulse response of the circuit, an adaptive filter network responsive to the output of the correlation network, the output of the transmitting equipment being applied also the adaptive filter network where it is modified in accordance with the output from the correlation network to form a plurality of dummy echoes and means for adding the inverted output of the adaptive filter network to the return channel in advance of the point at which the input to the correlation network is taken, and wherein the correlation network includes a tapped delay line to which the signal is fed, a plurality of multiplier circuits one for each tapping point on the delay line, each multiplier being fed with the delayed signal from the transmitting equipment and the input to the receiving equipment whereby an output being the product of the two inputs is obtained for a corresponding delay, a plurality of integrator circuits, there being one for each multiplier, each integrator circuit being fed with the output of the associated multiplier to generate a sample of the echo impulse response for the amount of delay in the circuit.

4. A method of suppressing echoes in a long distance both-way communication circuit including transmitting a reference signal in the forward channel wherein a separate random noise and communication signals transmitted over the forward channel are used as the reference signal, incrementally delaying the same reference signal, correlating the returned echoes of the reference signal with the delayed reference signal to produce a plurality of samples of the echo impulse response for the circuit, modifying the same speech signal as is transmitted in the forward channel by the echo impulse response samples so obtained to produce dummy echoes, inverting and adding the dummy echoes to the return channel to cancel the real echoes.